(12) United States Patent
Bachinski et al.

(10) Patent No.: US 6,419,186 B1
(45) Date of Patent: Jul. 16, 2002

(54) STANDOFF MOUNTING FOR AIR DATA SENSING PROBES ON A HELICOPTER

(75) Inventors: Thomas J. Bachinski; Timothy T. Golly, both of Lakeville; Robert G. Syring, Jr., Edina; Ronald J. Petri, Rosemount; Douglas G. Conley, Plymouth, all of MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/540,142

(22) Filed: Mar. 31, 2000

(51) Int. Cl.[7] .............................................. B64C 27/00
(52) U.S. Cl. ..................................... 244/17.11; 73/182
(58) Field of Search .............................. 244/1 R, 17.11; 416/61, 34, 35; 761/4, 7, 8, 9; 73/181, 182, 189, 212

(56) References Cited

U.S. PATENT DOCUMENTS

| | | | |
|---|---|---|---|
| 3,646,811 A | | 3/1972 | DeLeo et al. ................. 73/182 |
| 4,038,870 A | | 8/1977 | Rotier ......................... 73/181 |
| 4,184,149 A | * | 1/1980 | Baker et al. .................. 73/188 |
| 4,275,603 A | * | 6/1981 | Kalocsay .................... 73/182 |
| 4,574,360 A | * | 3/1986 | Bateman .................. 244/17.11 |
| 5,299,455 A | | 4/1994 | Mangalam ..................... 73/180 |
| 5,352,090 A | * | 10/1994 | Churchill et al. .............. 416/61 |
| 5,886,256 A | * | 3/1999 | DeAnna ...................... 340/962 |
| 6,010,095 A | * | 1/2000 | Hackmeister ........... 244/134 F |
| 6,205,376 B1 | * | 3/2001 | Gordon ......................... 701/9 |

* cited by examiner

Primary Examiner—Galen L. Barefoot
(74) Attorney, Agent, or Firm—Westman, Champlin & Kelly, P.A.

(57) ABSTRACT

A standoff arm and probe assembly for a helicopter has a standoff mounting arm that extends outwardly from the helicopter body in a selected direction, preferably forwardly. The standoff arm has an outer end that mounts a low lateral speed sensing probe that is positioned with an axis substantially parallel to the axis of a helicopter rotor, and within the downwash region of air movement causes by the rotor. The low lateral speed sensing probe has ports that are arranged annularly around the probe, and the pressures sensed at selected annular or peripheral locations on the probe are measured to determine low air speeds. Additionally, the standoff arm can mount a plurality of other sensors such as a pitot pressure probe extending forwardly from the arm, a lateral pressure sensing probe along a lateral side of the arm, and the arm can mount outside air temperature sensors, ice detectors, and total air temperature sensors, if desired.

19 Claims, 3 Drawing Sheets

STANDOFF MOUNTING FOR AIR DATA SENSING PROBES ON A HELICOPTER

BACKGROUND OF THE INVENTION

The present invention relates to a standoff mounting arm for mounting a probe for sensing slow lateral movements of a helicopter, which also mounts one or more additional air data sensing probes or sensors. The mounting arm extends forwardly or sideways from the helicopter body to support a vertically oriented probe in the downward airflow or downwash region below an overhead rotor. The vertically oriented probe has pressure sensing ports spaced around its periphery which all sense equal pressure when the helicopter is hovering but when there is horizontal movement, there are differential pressures sensed at ports on opposite sides of the probe. The standoff mounting arm also can support pitot pressure sensing probes, outside air temperature sensors, ice detectors, and/or total air temperature sensors.

Detecting low air speed on a helicopter is a problem, in that probe sensors that are now used for sensing very low air speeds are generally affected adversely by the downwash flow from the overhead rotor. In a hover mode, the existing probe sensors generally can detect some pressure differentials at higher speeds, but when the aircraft moves laterally very slowly in any direction, the sensors now used are not completely reliable.

Global positioning satellite receivers have been used for detecting lateral movement relative to the ground, but even those devices are incapable of detecting very low speed, such as when a helicopter is hovering and moves slightly horizontally, that is laterally, whether sideways, forwardly or rearwardly.

Global positioning satellite receivers only detect movement relative to an earth based coordinate system. Influences due to wind and helicopter orientation are ignored.

Standoff probes have been used on helicopters with rigid support arms that mount pitot pressure sensors and other air data sensors at outer ends thereof.

SUMMARY OF THE INVENTION

The present invention relates to a rigid standoff mounting arm that extends generally forwardly or sideways from the fuselage of a helicopter, and mounts a pressure sensing probe in the downwash of the rotor. The probe has an axis positioned substantially parallel to the axis of rotation of a helicopter rotor, or in other words perpendicular to a reference axis of the helicopter body. The pressure sensor probe in the downwash is provided with a plurality of ports symmetrically spaced around the outer surface of a barrel or tube, which is generally a cylindrical tube. When the helicopter is stationary, the same pressure is sensed at all the ports in the barrel or tube wall around the central axis of the probe, but when the helicopter starts to move laterally, that is sideways, forwardly or rearwardly, differentials in pressure are sensed at selected ports facing in the direction of movement, and compared to pressures sensed at the ports on the opposite side of the probe barrel or tube, and which face in an opposite direction from the direction of movement.

The standoff mounting arm of the present invention also mounts one or more other sensors. These sensors may include pitot pressure sensors, outside air temperature sensors, ice detectors, and total air temperature sensors.

DETAILED DESCRIPTION OF THE ILLUSTRATIVE EMBODIMENTS

Figure 1:
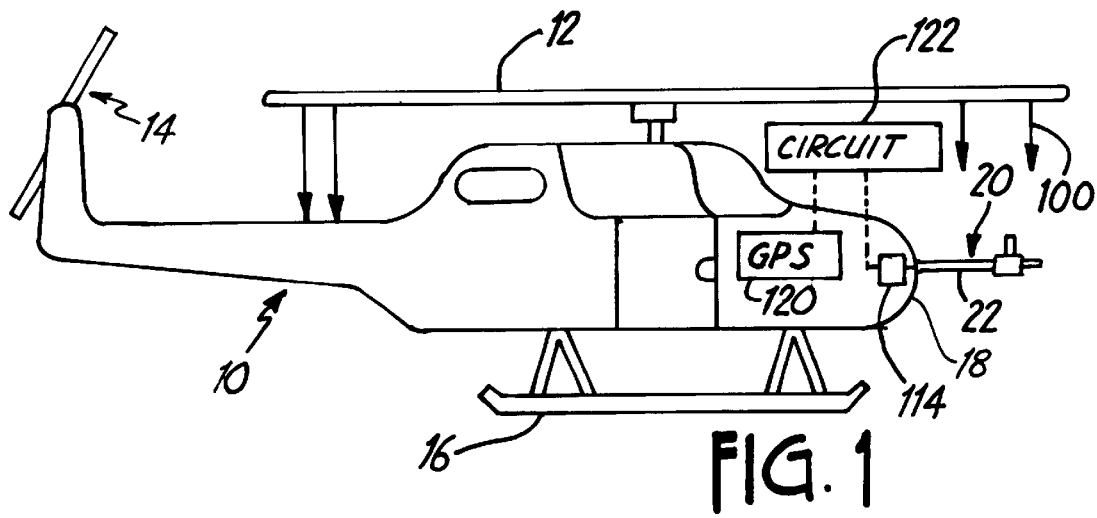
FIG. 1 is a schematic representation of a side view of a helicopter having a standoff support arm and slow movement sensor made according to the present invention.

In FIG. 1, an air vehicle, such as a helicopter is indicated generally at 10 and is of conventional design. The helicopter has a powered overhead rotor 12 that provides lift and is controllable for maneuvering, and the helicopter 10 also has a tail rotor 14 for control.

Figure 2:
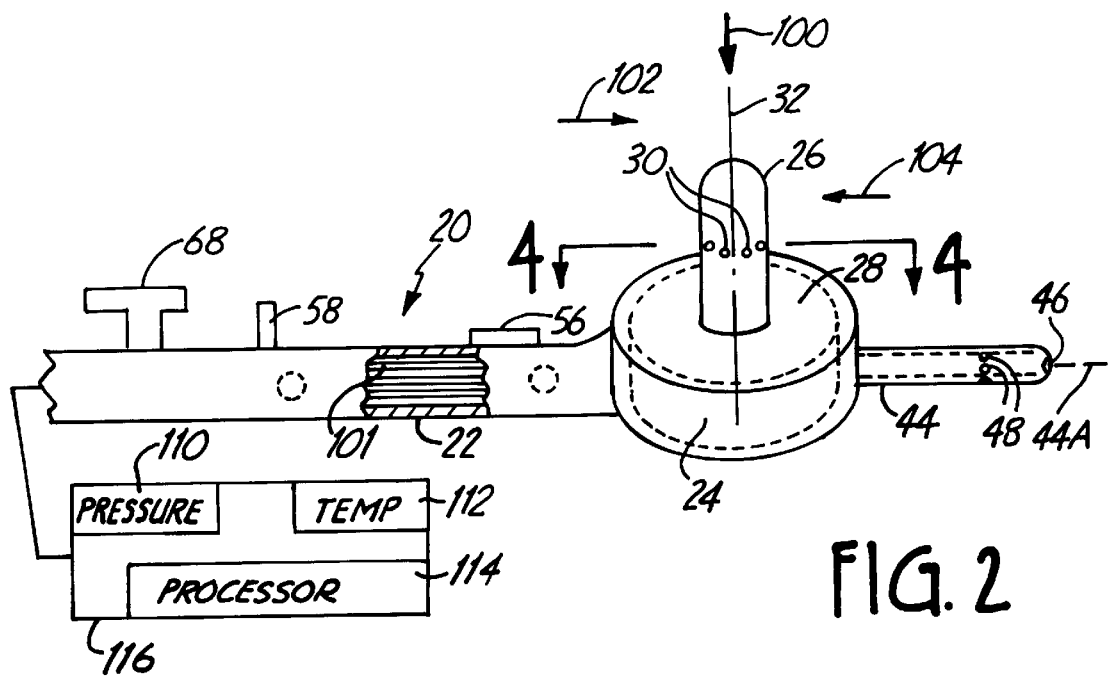
FIG. 2 is a part perspective schematic view of the standoff arm shown in FIG. 1.

Skids 16 are used for supporting the helicopter when it is on the ground, and as shown, a leading end portion 18 of the helicopter has a standoff mounting arm and sensing probe assembly 20 made according to present invention installed thereon. Referring to FIG. 2, the standoff arm assembly 20 has a rigid forwardly extending tubular arm 22 with a mounting housing 24 adjacent an outer end thereof. The mounting housing 24 can be, as shown, part cylindrical, formed about a vertical axis, or can be any other desired shape. The housing 24 has a central chamber and is used for mounting probes and for carrying pressures or for housing conduits for carrying pressure signals from the sensing ports on probes.

A low air speed sensing probe 26 is mounted on an upper wall 28 of the mounting housing 24, and provides pressure signals from a plurality of ports indicated at 30 which are arranged annularly and symmetrically around the central axis 32 of the probe 26. The top of the probe 26 is closed with a suitable shaped wall, as shown, a hemisphere. The number of ports 30 can be selected as desired. The interior of the probe 26 can be divided into separate chambers, by having an interior diametral divider wall or plate 37 (FIG. 4) that divides the tubular probe into half section chambers 36A and 36B. Another arrangement of chambers can be formed, if desired, such as four orthogonal chambers formed by additional walls indicated in dotted lines at 38A and 38B. The separate chambers are fluidly isolated from each other. The individual ports 30 can also be formed to have individual tubes or conduits leading from each of the ports so that pressures at the ports 30 can be individually sensed, or sensed by a differential pressure sensor 110. The signal from a differential pressure sensor may provide velocity and directional information. Pressure carrying conduits from probe 26 are positioned on the interior of the arm 22 and housing 24.

In addition, a pitot tube or probe 44 is mounted at the forward or leading end of the housing 24, and includes a pitot port 46 at its outer end together with static sensing ports, if desired, indicated at 48. The pitot tube 44 is conventionally constructed and used, but is mounted on the standoff mounting arm 22. The pitot tube 44 has a central axis 44A that is coincidental with the axis of mounting arm 22.

Figure 3:
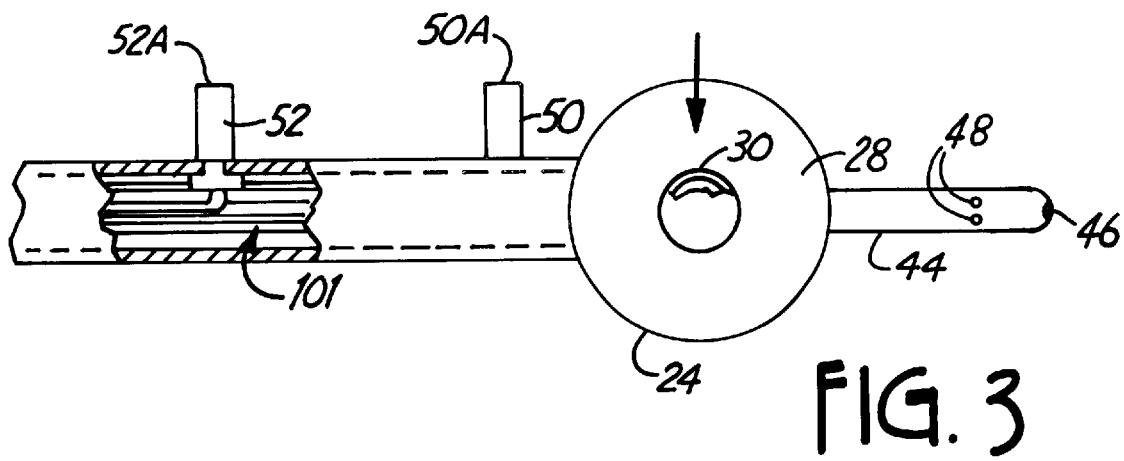
FIG. 3 is a top plan view of the standoff arm of FIG. 1.

Other sensors can be mounted on arm 22 including a laterally facing pitot pressure sensing tube or probe 50 or 52, (or both) which are mounted onto the side of the standoff mounting arm 22 (FIG. 3). The probes 50 or 52 have ports 50A and 52A at the outer ends, respectively that face in an orthogonal direction, that is, the ports are for sensing pressure from airflow 900 to the axis of pitot port 46 of the probes or tube 44. A probe such as probe 50 or 52 is used for sensing relative flow direction at higher sideways lateral speeds when used with the pitot tube or probe 44.

Other sensors or probes that can be mounted onto the standoff arm 22 include an outside air temperature sensor 56, an ice detector 58, and a total air temperature sensor 60, all of conventional design. The standoff arm 22 thus forms a support for a multiple number of various air data sensors or sensing devices. A single standoff mounting arm with an outer support housing 24 can be used for mounting all of the air data sensors needed for reliable operation of the helicopter.

Figure 5:
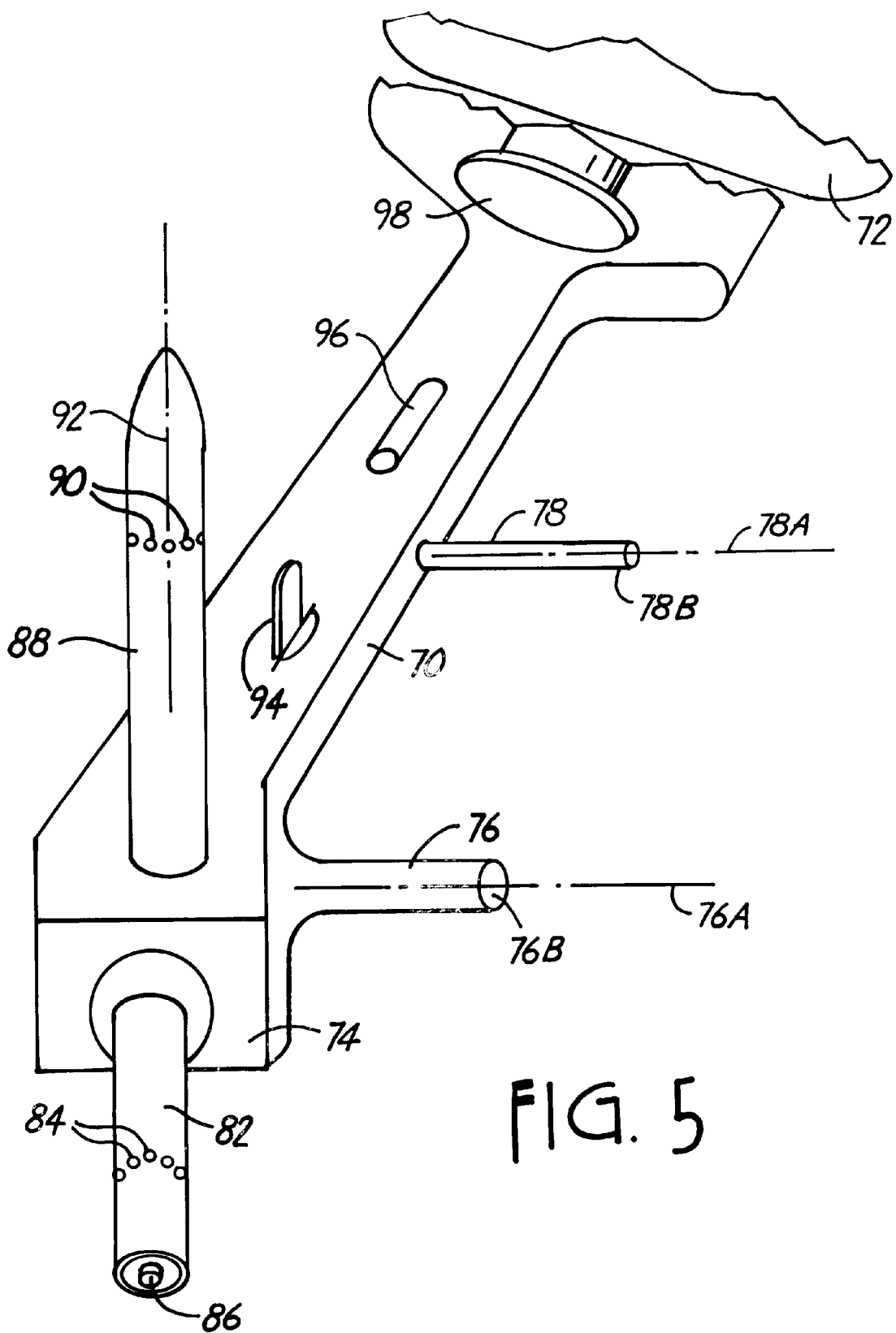
FIG. 5 is a perspective view of the modified standoff support arm also showing an arrangement of a plurality of different sensors mounted on the standoff arm.

Referring to FIG. 5, a modified standoff mounting arm 70 is mounted onto a helicopter body shown only fragmentarily at 72, and in this case, the cross sectional shape of the tubular standoff arm 70 is rectangular, with a rectangular outer housing 74 at its outer end. The housing 74 also defines an interior chamber and can be angled from the axis of the arm. In this instance, a lateral pitot pressure sensing tube or probe 76 is mounted onto the standoff arm 70. Tube or probe 76 is mounted on the side surface of the housing 74, and or if desired the probe 76 may be mounted on the arm 70. A laterally extending pitot probe can be mounted at any location on standoff arm 70, such as that shown by probe 78. The probes or tubes 76 and 78 have axes 76A and 78A centered on ports 76B and 78B. The axes 76A and 78A are perpendicular to the longitudinal axis of the standoff arm 70.

As shown, a pitot sensing tube or probe 82 is mounted at the forward end of the housing 74 with an axis at an angle with the axis of standoff arm 70. The tube or probe 82 includes static sensing ports 84 on a side surface, and a forward facing pitot pressure sensing port 86. A downwash, low lateral speed sensor tube or probe 88 is the same as that shown at 26 in FIGS. 2, 3 and 4, and includes a plurality of ports 90 around the periphery thereof, with the ports 90 being symmetrically spaced all the way around the central axis 92 of the probe or tube. The axis 92 is perpendicular to the axis of arm 70 and perpendicular to the plane defined by the axes of probes 76 and 82. Low speed sensing probe 88 is located in a downwash area of the rotor of the helicopter as previously stated. An outside air temperature sensor 94 is mounted on the standoff arm 70, and an ice detector 96 is also mounted on standoff arm 70 at a selected location. A total air temperature sensor 98 can be mounted on standoff arm 70 closer to the helicopter body, and can protrude at a selected angle to the plane of the standoff arm 70 so that airflow will pass through the total air temperature sensor to provide an indication of such temperature.

Again, the standoff arm 70 provides a mounting platform for a multiple number of probes including the laterally facing pitot tube or probe 76 and the low air speed sensor tube or probe shown at 88.

Figure 4:
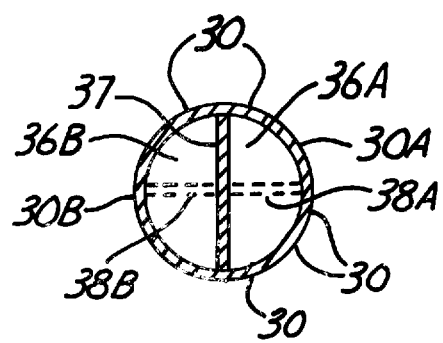
FIG. 4 is a sectional view taken on line 4—4 in FIG. 2.

Referring to FIGS. 2, 3 and 4, the low air speed sensing probe operation can be explained. The probe 26, as shown, is subjected to downwash air flow indicated by the arrow 100, that flows around the probe 26 evenly when the helicopter is hovering. The pressure sensed at each of the ports 30 in the hovering mode will be equal, since when hovering there will be no lateral movement of the air vehicle through the air mass, although there may be wind drift.

The hovering mode can be combined with intermittent lateral movement at very low air speeds, and by way of example, when the lateral movement is in a forwardly direction indicated by the arrow 102 in FIG. 2, the relative air flow in the opposite direction indicated by the arrow 104, will cause a greater pressure at the forward probe port or ports 30A, on the probe or tube 26 which are also illustrated by way of example in FIG. 4, than at the rearward facing port or ports 30B.

When a center diametral dividing wall 37 is provided in probe or tube 26 to form only interior chambers 36A and 36B, the pressure in the chamber 36A will then be greater than the pressure in the chamber 36B, and this is an indication of a forward speed. By adding the cross walls 38A and 38B shown in FIG. 4 so there are four chambers with ports sensitive to pressure in each quadrant, the tube or probe can be even more sensitive to orthogonal directions of movement. If the helicopter is moving at an angle laterally, such as in a combined forward and lateral movement, different pressures will be sensed in the different quadrants of the probe. The chamber in each quadrant of the probe 26 having ports facing more toward the direction of movement will have a higher pressure. The probe is sensitive to very low air speeds because of the different differentials of pressure caused by the differences in direction of movement and the differential pressure enhancing effect of the downwash airflow. Pressure transducers including differential pressure transducers are used to measure pressures in a conventional manner to determine relative airflow velocity. Such transducers are shown in the prior art.

The pitot pressure sensors 50 or 52 also will indicate lateral sideways movement, by the pressure at the end ports 50A or 52A. If there is angular movement relative to the helicopter reference axis, the pressures at the ports 50A or 52A, (or 76A or 78A in the second form of the invention) will be different from the pressure sensed when the helicopter is moving orthogonally in a direction along those port axes and can provide an indication of the direction of aircraft movement. Again, only one of the probes 50 or 52 or 76 or 78 will normally be provided.

Differential pressure sensors 110, temperature sensors 112, and digital processing circuits 114 shown schematically in FIG. 2 can be provided in a controller housing 116 that can be mounted right on the end of standoff arm 22 on the interior of the helicopter skin (a smartprobe arrangement), or the sensors and circuits can be provided at suitable on board air data computers. Usually the pressures are carried in conduits shown at 101 in FIGS. 2 and 3 to the pressure sensors. The pressure sensors are preferably located very close to the mounting of the standoff arm 22 or the standoff arm 70. Differential pressure sensors are used to sense differences in pressures between selected chambers of tubes or probes 26 and 82, while selected pressure sensors also are used to sense changes in pressures at the pitot ports 46 or 86 and 50A or 76A.

The low speed sensing probe 26 positioned in the downwash region is sensitive to slow lateral movement. The rotor downwash flows evenly over all the orthogonal or laterally facing annularly spaced ports 30, thereby cancelling out the pressures from each other in a hover mode. As the helicopter enters its flight regime of forward flight, the front ports, which are illustrated in FIG. 2 and subject to the flow shown by arrow 104 will see an increase in rotor downwash pressure as the trailing ports on the backside of the probe see less pressure. The downwash flow enhances the changes or differences in pressure sensed at the ports facing in opposite direction along the axis or line of movement. This phenomena exists until the pitot static system mounted directly on the fuselage becomes operable. A pitot static system, such as used with probe 44 will be effective when the speed of the helicopter in a forward direction increases a desired amount, and the laterally sensing pitot probes can be used for higher speed lateral movements.

The same phenomena would occur for lateral movement, that is, the ports on the lateral side of probe 26 which face in the direction of movement would see an increase in the rotor downwash pressure, and the ports on the leeward side or the trailing side of the probe would see a decrease in pressure thereby giving an indication of the lateral movement.

The system also can be tied in with global positioning satellite navigation (GPS) systems. GPS systems have difficulty accurately indicating slow speed, and corrections or indications from probe 26 can be used with a GPS receiver for more accuracy by using the sensed pressures as a correction factor for the GPS velocity until the differentials in pressure exceed a desired amount, where it is known the GPS system will be giving true velocities. The same corrections based on the differential pressures from probe 26 can be used with an existing inertial guidance system for providing an accurate indicator of low speed lateral movements. By subtracting measured ground speed from a GPS receiver, as shown schematically at 120 in FIG. 1, from the air speed obtained from the air velocity sensors used with the standoff arm, the wind speed and direction can be calculated. The calculation is carried out by a subtraction circuit or processor 122 that receives the ground speed and direction signals from the GPS receiver 110 signals indicating air speed and direction from the air speed sensor circuits 114. The processor resolves the signals in accordance with a program to determine direction.

Although the present invention has been described with reference to preferred embodiments, workers skilled in the art will recognize that changes may be made in form and detail without departing from the spirit and scope of the invention.

What is claimed is:

1. A standoff air data sensor for helicopters having a main rotor comprising a rigid standoff arm, said rigid standoff arm extending a desired distance from a mounting surface of the helicopter, a probe mounted at an outer end of the standoff arm with an axis substantially parallel to an axis of rotation of the rotor of the helicopter, and within a downwash flow from the rotor, said probe having a plurality of ports symmetrically spaced annularly about a central axis of the probe, and pressure sensing connections to the ports to permit sensing pressures at selected ports on opposite sides of the probe.

2. The standoff sensor of claim 1, wherein said ports on the probe include ports facing in opposite directions in a plane perpendicular to the probe axis, and pressures at the ports facing in opposite direction being measured relative to each other.

3. The standoff sensor of claim 2, wherein said probe has a dividing wall therein to permit separately sensing pressures at the oppositely facing ports.

4. The standoff sensor of claim 1 including a pitot probe extending forwardly of the standoff arm, and having a pitot pressure sensitive port at a leading end thereof.

5. The standoff sensor of claim 4 including a lateral flow sensing probe having an end port and extending laterally from the standoff arm, and having an axis positioned at an angle different from the direction of the axis of the standoff arm and from a central axis of the pitot probe.

6. The standoff sensor of claim 5, wherein the axis of the lateral flow sensing probe lies on a plane including the axis of the standoff arm and the central axis of the pitot probe.

7. The standoff sensor of claim 5 further including a outside air temperature sensor mounted on said standoff arm.

8. The standoff sensor of claim 5 further including a total temperature sensor mounted on said standoff arm.

9. The standoff sensor of claim 5 further including an ice detector mounted on said standoff arm.

10. A slow speed sensing system for helicopters having a main rotor rotatable about a generally vertical axis, comprising a sensing probe having a plurality of ports arranged around a periphery of the probe, the ports being substantially centered on a plane perpendicular to a longitudinal axis of the probe, the longitudinal axis of the probe being substantially parallel to the rotor axis, and a standoff mounting arm for mounting said probe relative to a surface of the helicopter and supporting and spacing said probe from the helicopter and within a downwash airflow region of the rotor of the helicopter.

11. The sensor assembly of claim 10, wherein said standoff arm comprises a hollow tube, said hollow tube carrying conduits for carrying pressure signals from the ports on the probe to pressure transducer.

12. The sensor assembly of claim 10, wherein said ports are symmetrically spaced around the periphery of the probe.

13. The sensor assembly of claim 10, wherein said probe is tubular, and has a dividing wall that bisects the tube and extends along a longitudinal length to provide separate pressure chambers within the tube at least one of the ports opening to each pressure chamber.

14. The sensor assembly of claim 13, wherein there are wall portions positioned perpendicular to the wall, to divide the tube into four chambers, each of the chambers having at least one port open to the chamber.

15. The sensor assembly of claim 12, wherein said standoff arm has a housing at an outer end thereof, and a pitot tube extending forwardly of the housing, and facing in a forward direction relative to a helicopter reference axis.

16. The sensor assembly of claim 15 including a temperature sensor mounted on said standoff arm.

17. The sensor assembly of claim 15 including a second pitot pressure sensing probe facing in a direction generally perpendicular to the axis of the pitot tube facing in a forward direction.

18. The sensor assembly of claim 15, wherein said pitot probe has a plurality of static pressure sensing ports around the periphery thereof and positioned between the standoff arm housing and an outer end of the probe.

19. The sensing system of claim 10, wherein the helicopter has a global positioning satellite (GPS) receiver providing signal indicating speed and direction relative to the ground, the probe having a sensor providing signals indicating air speed and direction of the helicopter and a circuit for correlating the signals from the GPS receiver and the probe to provide the speed and direction of wind relative to the ground.

* * * * *